(12) United States Patent
Takayasu et al.

(10) Patent No.: US 7,315,835 B1
(45) Date of Patent: Jan. 1, 2008

(54) PRICE FLUCTUATION PREDICTING DEVICE AND PREDICTING METHOD, PRICE FLUCTUATION WARNING DEVICE AND METHOD, AND PROGRAM PROVIDING MEDIUM

(75) Inventors: Hideki Takayasu, Tokyo (JP); Misako Takayasu, Hokkaido (JP)

(73) Assignee: Sony Corporation, Tokyo (JP)

(*) Notice: Subject to any disclaimer, the term of this patent is extended or adjusted under 35 U.S.C. 154(b) by 1363 days.

(21) Appl. No.: 09/611,896

(22) Filed: Jul. 7, 2000

(30) Foreign Application Priority Data

Jul. 8, 1999 (JP) .................................. 11-194322

(51) Int. Cl.
*G06Q 40/00* (2006.01)

(52) U.S. Cl. ........................................................ 705/35
(58) Field of Classification Search ............. 705/35–45
See application file for complete search history.

(56) References Cited

OTHER PUBLICATIONS

Excel 2000 Advanced, pp. 199-210.*

* cited by examiner

*Primary Examiner*—Richard Weisberger
(74) *Attorney, Agent, or Firm*—Finnegan, Henderson, Farabow, Garrett & Dunner, L.L.P.

(57) ABSTRACT

An open market is made up of numerous dealers, and each dealer is allowed to freely set selling and buying prices. Dealers tend to predict prices while being affected by recent price changes, and to determine trading prices such as selling prices and buying prices accordingly. Also, in the overall trading market, there is a price at which the selling prices and buying prices decided by each dealer are balanced, i.e., a virtual equilibrium price. While trading prices can be observed in a real trading market, the virtual equilibrium price cannot be observed. The present Inventors have transcendentally reached the two following properties in the open market; that trading prices change in the direction of narrowing the gap with the virtual equilibrium price, and that the virtual equilibrium price fluctuates according to the nature of dealers which is that dealers are affected by recent price changes. Accordingly, abnormalities in price fluctuations in an open market wherein dealers are allowed to freely set prices are predicted and warnings are issued.

3 Claims, 10 Drawing Sheets

PRICE FLUCTUATION PREDICTING DEVICE AND PREDICTING METHOD, PRICE FLUCTUATION WARNING DEVICE AND METHOD, AND PROGRAM PROVIDING MEDIUM

BACKGROUND OF THE INVENTION

1. Field of the Invention

The present invention relates to data processing technology for processing always-fluctuating time-sequence data, and particularly relates to a processing device and processing method handling time-sequence data which predicts fluctuations to occur in the time-sequence data and further issue warning according to the prediction results.

More specifically, the present invention relates to a processing device and processing method which handles prices of products, services, etc., in a marketplace economy, as time-sequence data, and predicts fluctuation of the data and issues warnings according to the prediction results, and more particularly relates to a processing device and processing method which handles prices in an open market wherein dealers are allowed to freely set prices such as selling prices and buying prices, as time-sequence data.

2. Description of the Related Art

There is a dominant principle in marketplace economy societies, that the price of products are determined by an equilibrium between supply and demand.

The properties in such a marketplace economy can be represented by supply-and-demand curves such as shown in FIG. 16, as is well-known. That is, while the demand curve is a curve wherein prices gradually descend according to the quantity of products on the market, the supply curve is a curve wherein prices gradually rise according to the quantity of products. The intersection between the two curves is the equilibrium point between supply and demand, and market prices of products are determined based on this. The fact that time-sequence data in market economies such as market prices can be analyzed by computer systems and that future tendencies can be predicted are well-known from both information processing and economic fields.

However, it is a common view that the supply-and-demand curve such as shown in FIG. 16 does not apply to so-called "open-markets" wherein the dealers can freely set selling prices and buying prices. Examples of an open market are securities markets including stock markets, exchange markets, gold and futures markets, and so forth. The reason that common supply-and-demand curves cannot be applied to these is that the buyer and the seller are often the same. That is, in an open market, the price of products are determined in an ever-changing manner, in response to various factors including the predictions and strategies of multiple dealers made up of buyers and sellers.

In a general trading market, the movements can be grasped by calculating correlation functions regarding fluctuations in trading prices. However, in an open market, increasing the number of samples (i.e., continue measuring trading prices for long periods of time) causes the sampled data to cancel one another out, thereby loosing the correlation so the trends in the trading market cannot be grasped.

Movements in the open market, i.e., market prices of various products, are even now fluctuating from one second to the next on a global scale. The accuracy of such product price predications does not only affect the profits of a group of dealers, but rather could affect the social stability of a region, nation, or even the global community.

To rephrase this straightforwardly, accurately and effectively predicting the always-changing product prices in an open market, and issuing warnings regarding prediction results indicating abnormal price fluctuations, is an important and urgent issue which must be addressed.

SUMMARY OF THE INVENTION

Accordingly, it is an object of the present invention to provide an excellent time-sequence data processing device and processing method which handles as time-sequence data prices relating to products, services, etc., in a marketplace economy, so as to predict fluctuations in price data and further issue warnings according to prediction results of abnormal fluctuations.

It is another object of the present invention to provide an excellent time-sequence data processing device and processing method which handles as time-sequence data prices in an open market wherein dealers are allowed to freely set prices such as selling prices and buying prices, so as to predict product prices which fluctuate according to trading, and further issue warnings according to prediction results of prices.

The present invention has been made taking the above problems into consideration, and according to a first aspect thereof, a price fluctuation predicting device or method for predicting always-changing price fluctuations in a type of trading market made up of multiple dealers wherein each dealer can freely set selling prices and buying prices, and wherein trading prices are predicted according to price resilience, and wherein equilibrium prices where selling prices and buying prices in the entire market reach an equilibrium according to market instabilities are predicted, comprise:

(a) means or a step for preparing a plurality of theoretical models of correlation functions of prices which are determined uniquely by indicators indicating price resilience and market instability;

(b) means or a step for sampling real trading prices in a trading market;

(c) means or a step for generating real correlation functions based on the sampled trading prices;

(d) means or a step for matching the correlation functions generated by the means or step (c) with the theoretical models in the means or step (a), and selecting the theoretical model which matches the best; and (e) means or a step for identifying the indicators of the price resilience and market instability which the theoretical model selected by the means or step (d) has, with that which exists in the real trading market.

A so-called open market is made up of numerous traders, i.e., dealers, and each dealer is allowed to freely set selling and buying prices. Generally, dealers tend to predict prices while being affected by recent price changes, and determining trading prices such as selling prices and buying prices accordingly. Also, in the overall trading market, there is a price at which the selling prices and buying prices decided by each dealer are balanced in the overall trading market, i.e., a virtual equilibrium price. Dealers can observe trading prices in a real trading market. However, on the other hand, the virtual equilibrium price is only hypothetical, and thus cannot be observed by the dealers.

The present Inventors have transcendentally reached the two following properties in the open market. These are:

(1) That trading prices change in the direction of narrowing the gap with the virtual equilibrium price.

(2) That the virtual equilibrium price fluctuates according to the nature of dealers, which is that dealers are affected by recent price changes.

In the former, the degree of effect on the trading prices that the gap between the virtual equilibrium price and the trading price is called "price resilience" in the field of economics. Also, in the latter, the degree of effect which recent price changes have on the dealers implies the instability of the trading market. The reason is that, in the event that the dealers are sensitive to price change, and trading prices soar following the rising virtual equilibrium price, the soaring trading prices encourage further increase of the virtual equilibrium price, and a so-called "bubble" phenomena is created as the result of such chain reactions. on the other hand, in the event that dealers are dull regarding price changes, price fluctuations in the market dull, and the market stabilizes.

Whether or not price fluctuations in the trading market are abnormal can be judged by a combination of the values of indicators indicating such price resilience and market instability. Also, price fluctuation properties in the trading market can be expressed by correlation functions. Further, the Present Inventors have transcendentally reached that price fluctuation correlation function patters are in a unique relation with the combination of the values of indicators indicating such price resilience and market instability.

With the present invention, multiple theoretical models relating to correlation functions determined by price resilience and market instability are prepared. Then, the theoretical model which matches correlation functions the best based on actual measurement results in the market is selected, and the price resilience and market instability which the theoretical model has is identified as that in the current trading market. Further, whether or not the price fluctuations are abnormal can be predicted based on the price resilience and market instability.

In the price fluctuation predicting device or method according to the first aspect of the present invention, the means or step (c) may generate correlation functions based on a relatively small number of sets of sampling data.

In an open market made up of multiple dealers who are allowed to freely set selling and buying prices, it is generally understood that increasing the number of samples mutually cancels out the characteristic portions of each set of data, which results in the correlation function converging to zero (later described). Accordingly, with the present invention, the number of samples has be restricted to a small number, thereby retaining the characteristic portions in the correlation function. Specifically, around 50 samples is sufficient. In a trading market, a tick (i.e., an established deal. However, note that the time between ticks is undetermined) occurs every several seconds, so this is equivalent to around 5 minutes worth of sampling.

According to a second aspect of the present invention, a price fluctuation predicting device or method for predicting the state in a trading market with always-fluctuating prices, made up of multiple dealers wherein each dealer can freely set selling prices and buying prices, comprise:

means or a step for obtaining price resilience indicators representing the ease of price fluctuation in the trading market;

means or a step for obtaining market instability indicators representing the degree of effect which recent price changes have on the trading market; and means or a step for predicting the state of the trading market based on a combination of the price resilience indicators and market instability indicators obtained by the above means or steps.

Also, according to a third aspect of the present invention, a price fluctuation warning device or method for warning of abnormalities in price fluctuations in a type of trading market made up of multiple dealers wherein each dealer can freely set selling prices and buying prices, and wherein trading prices are predicted according to price resilience, and wherein equilibrium prices where selling prices and buying prices in the entire market reach an equilibrium according to market instabilities are predicted, comprise:

(a) means or a step for preparing a plurality of theoretical models of correlation functions of prices which are determined uniquely by indicators indicating price resilience and market instability;

(b) means or a step for sampling real trading prices in a trading market;

(c) means or a step for generating real correlation functions based on the sampled trading prices;

(d) means or a step for matching the correlation functions generated by the means or step (c) with the theoretical models in the means or step (a), and selecting the theoretical model which matches the best;

(e) means or a step for identifying the indicators of the price resilience and market instability which the theoretical model selected by the means or step (d) has, with that which exists in the real trading market;

(f) means or a step for judging that price fluctuations are abnormal in the event that the combination of price resilience and market instability indicators determined by the means or step (e) is within a predetermined range; and (g) means or a step for issuing a warning in response to abnormality judgements.

By correcting trading prices in response to this warning, dealers can avoid personal loss, and further secure gain. Also, by correcting trading prices in trading markets on regional, national, or global scales, economic crises such as the collapse of bubble economies can be prevented beforehand, thereby warranting public welfare.

With the price fluctuation predicting device or method of the third aspect of the present invention, the means or step (c) may generate correlation functions based on a relatively small number of sets of sampling data (same as above).

Also, the price fluctuation warning device may further comprise (h) connecting means for connecting to external devices; whereby the means or step (g) issue warnings to external devices via the connecting means.

In our present society with highly-developed information processing and information communication technology, the trading market is growing on a global scale. Accordingly, even in the event that abnormalities in price fluctuations can be predicted. effectively and accurately, this is meaningless if countermeasures based on the prediction results can only be taken on a local basis. Also, there are likely to be situations wherein dealers would be extremely interested in predictions of abnormalities in price fluctuations at remote locations. Connecting the price fluctuation warning device to a Wide-Area Network such as the Internet and distributing the prediction results thereby enables the predicted abnormal state information to be used worldwide.

Also, according to a fourth aspect of the present invention, a price fluctuation warning device or method for predicting abnormal price fluctuations in always-fluctuating prices in a trading market made up of multiple dealers wherein each dealer can freely set selling prices and buying prices, and issuing warnings, comprise:

means or a step for obtaining price resilience indicators representing the ease of price fluctuation in the trading market;

means or a step for obtaining market instability indicators representing the degree of effect which recent price changes have on the trading market;

means or a step for predicting that prices will fluctuate abnormally in the event that the combination of the price resilience indicators and market instability indicators obtained by the means is within a predetermined range; and means or a step for issuing warnings in response to the prediction of abnormal fluctuation.

The price fluctuation warning device according to the fourth aspect of the present invention may further comprise connecting means for connecting to external devices; whereby the means or step for issuing warnings issue warnings to external devices via the connecting means (same as above).

Also, according to a fifth aspect of the present invention, a program providing medium provides in a tangible and computer-readable format a computer program for executing on a computer system the processing for predicting always-changing price fluctuations in a type of trading market made up of multiple dealers wherein each dealer can freely set selling prices and buying prices, and wherein trading prices are predicted according to price resilience, and wherein equilibrium prices where selling prices and buying prices in the entire market reach an equilibrium according to market instabilities are predicted, the computer program comprising:.

(a) a step for preparing a plurality of theoretical models of correlation functions of prices which are determined uniquely by indicators indicating price resilience and market instability;

(b) a step for sampling real trading prices in a trading market;

(c) a step for generating real correlation functions based on the sampled trading prices;

(d) a step for matching the correlation functions generated in the step (c) with the theoretical models in the step (a), and selecting the theoretical model which matches the best; and (e) a step for identifying the indicators of the price resilience and market instability which the theoretical model selected in the step (d) has, with that which exists in the real trading market.

With the program providing medium according to the fifth aspect of the present invention, the step (c) generates correlation functions based on a relatively small number of sets of sampling data (same as above).

Also, according to a sixth aspect of the present invention, a program providing medium provides in a tangible and computer-readable format a computer program for executing on a computer system the processing for predicting the state in a trading market with always-fluctuating prices, made up of multiple dealers wherein each dealer can freely set selling prices and buying prices, the computer program comprising:

a step for obtaining price resilience indicators representing the ease of price fluctuation in the trading market;

a step for obtaining market instability indicators representing the degree of effect which recent price changes have on the trading market; and a step for predicting the state of the trading market based on a combination of the price resilience indicators and market instability indicators obtained by the steps.

Also, according to a seventh aspect of the present invention, a program providing medium provides in a tangible and computer-readable format a computer program for executing on a computer system the processing for warning of abnormalities in price fluctuations in a type of trading market made up of multiple dealers wherein each dealer can freely set selling prices and buying prices, and wherein trading prices are predicted according to price resilience, and wherein equilibrium prices where selling prices and buying prices in the entire market reach an equilibrium according to market instabilities are predicted, the computer program comprising:

(a) a step for preparing a plurality of theoretical models of correlation functions of prices which are determined uniquely by indicators indicating price resilience and market instability;

(b) a step for sampling real trading prices in a trading market;

(c) a step for generating real correlation functions based on the sampled trading prices;

(d) a step for matching the correlation functions generated in the step (c) with the theoretical models in the step (a), and selecting the theoretical model which matches the best;

(e) a step for identifying the indicators of the price resilience and market instability which the theoretical model selected by the step (d) has, with that which exists in the real trading market;

(f) a step for judging that price fluctuations are abnormal in the event that the combination of price resilience and market instability indicators determined in the step (e) is within a predetermined range; and (g) a step for issuing a warning in response to abnormality judgements.

With the program providing medium according to the seventh aspect of the present invention, the step (c) may generate correlation functions based on a relatively small number of sets of sampling data (same as above).

Also, the computer system to which the program providing medium is mounted may be carried out on a device having connecting means for connecting to external devices; with the step (g) issuing warnings to external devices via the connecting means (same as above).

Also, according to an eighth aspect of the present invention, a program providing medium provides in a tangible and computer-readable format a computer program for executing on a computer system the processing for predicting abnormal price fluctuations in always-fluctuating prices in a trading market made up of multiple dealers wherein each dealer can freely set selling prices and buying prices, and issuing warnings, the computer program comprising:

a step for obtaining price resilience indicators representing the ease of price fluctuation in the trading market;

a step for obtaining market instability indicators representing the degree of effect which recent price changes have on the trading market;

a step for predicting that prices will fluctuate abnormally in the event that the combination of the price resilience indicators and market instability indicators obtained in the steps is within a predetermined range; and a step for issuing warnings in response to the prediction of abnormal fluctuation.

With the program providing medium according to the eighth aspect of the present invention, the computer system to which the program providing medium is mounted may be carried out on a device having connecting means for connecting to external devices; with the step for issuing warnings, issuing warnings to external devices via the connecting means (same as above).

The program providing medium relating to the fifth through eighth aspects of the present invention is a medium for providing a general-purpose computer system capable of executing various types of program code with a computer program in a tangible and computer-readable format. The form of the medium is not restricted in particular, and may be a detachable and transportable storing medium such as a CD (Compact Disk), FD (Floppy Disk), MO (Magneto-Optical disk), and so forth, a transporting medium such as a network (whether wireless or cable), or otherwise.

Such a program providing medium defines the structural and/or functional cooperative relation between the computer program and the providing medium, for realizing the functions of a predetermined computer program on a computer system. In other words, installing the predetermined computer program on a computer system by the program providing medium relating to the fifth through eighth aspects of the present invention exhibits the cooperative operations on the computer system, thereby allowing effects of operation equal to those as the first through fourth aspects of the present invention to be obtained.

Further objects, characteristics, and advantages of the present invention will become more apparent from detailed description based on the later-described embodiments of the present invention and the appended drawings.

DESCRIPTION OF THE PREFERRED EMBODIMENTS

Figure 1:
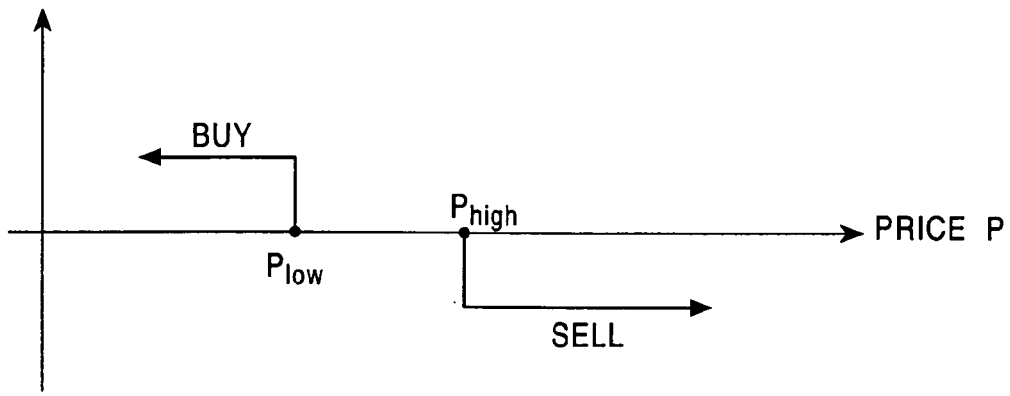
FIG. 1 is a chart illustrating the trading properties of a given dealer regarding a given specific product in an open market.

The trading properties of each dealer relating to a given product can be expressed as in FIG. 1, for example. That is, in the event that the price of the product reaches or exceeds a predetermined value $P_{high}$ on the open market, the dealer turns to "selling", and in the event that the price is at or below a predetermined value $P_{low}$, the dealer turns to "buying". The product of the difference between the selling price $P_{high}$ and the buying price $P_{low}$ ($P_{high}-P_{low}$) and the number of products handled is the profit of the dealer regarding this product in this case.

As described above, the open market is characterized in that dealers can freely set the selling price $P_{high}$ and the buying price $P_{low}$. That is, the selling price $P_{high}$ and the buying price $P_{low}$ each take on different values for each dealer.

Figure 2:
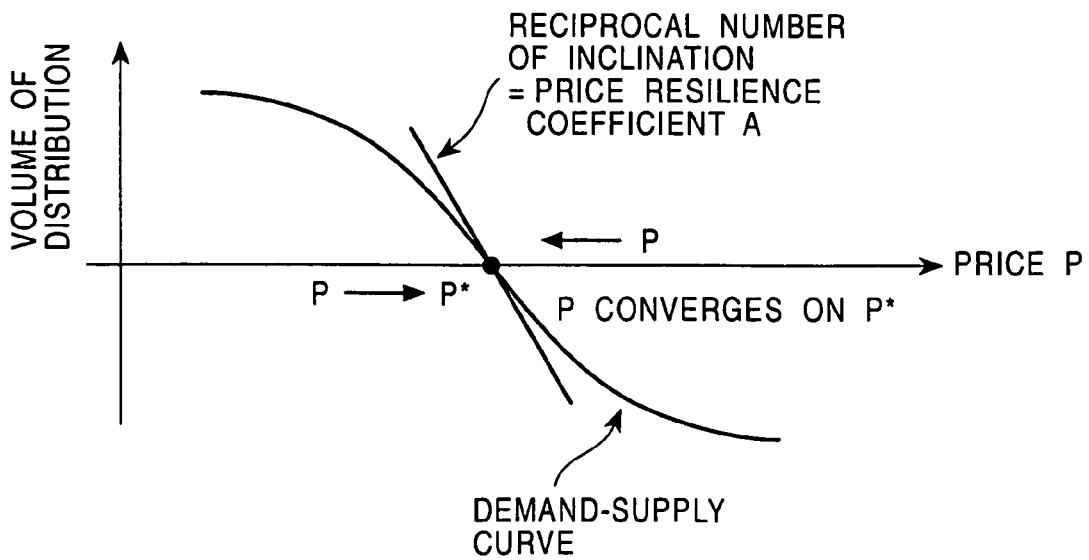
FIG. 2 is a chart illustrating the trading properties of the entire open market regarding a given specific product.

Overlapping the trading properties for all the dealers regarding a specified product on the open market forms a supply-and-demand curve relating to the specified product for the entire open market, as shown in FIG. 2. The horizontal axis in this graph represents the trading price for the product, and the vertical axis represents the volume of demand or volume of supply for the product.

Figure 16:
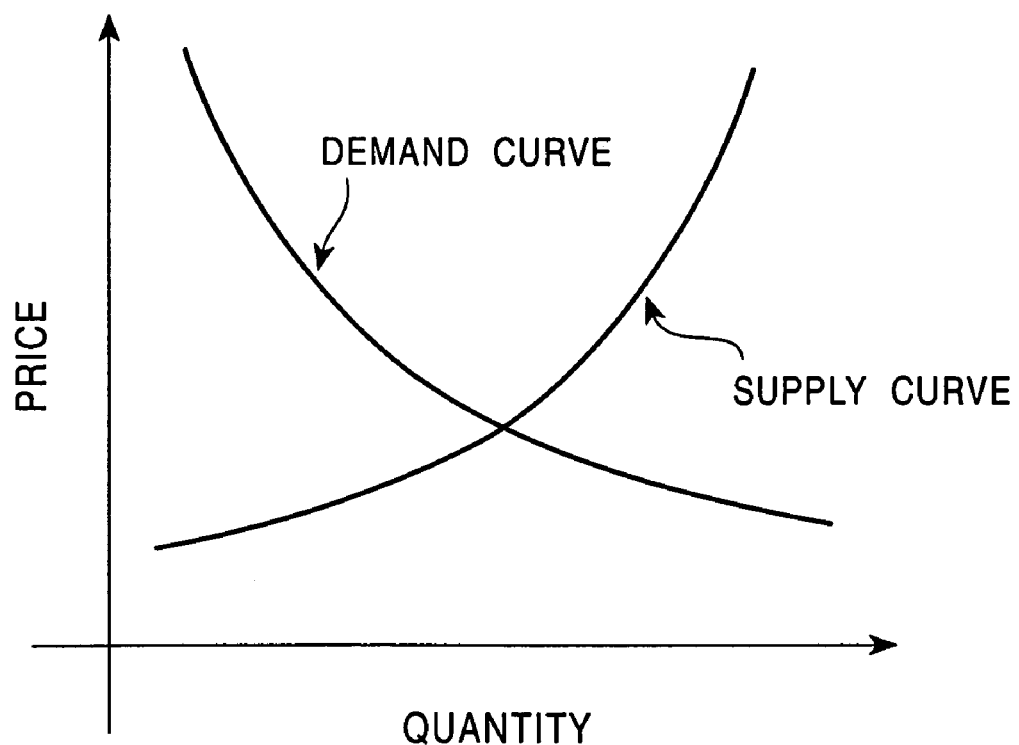
FIG. 16 is a chart illustrating a general supply-and-demand curve.

The supply-and-demand curve shown in FIG. 2 represents the relation between supply and demand with a single curve, and differs from the general supply-and-demand curve shown in FIG. 16 which represents price properties with separate curves for supply and demand in this aspect.

In the graph shown in FIG. 2, in the event that the curve is in the price band above the horizontal (price) axis, this means the market is a buyers' market, and conversely in the event that the curve is in the price band below the horizontal (price) axis, this means the market is a sellers' market. The intersection P* between the supply-and-demand curve and the price axis is the price at which an equilibrium price P* is realized in the overall open market, where an equilibrium is reached between supply and demand. Note however that each dealer can only grasp his/her own selling price $P_{high}$ and buying price $P_{low}$ as shown in FIG. 1 and cannot actually observe the equilibrium price P* on the entire market. In this sense, P* is a price which is set on the open market in a virtual manner, and shall be referred to a "virtual equilibrium price" in the present specification. On the other hand, the prices $P_{high}$ and $P_{low}$ which are actually traded by the dealers on the open market can be observed by the dealers on the open market, of course.

Both the virtual equilibrium price P* and the trading price P are time-sequence data which fluctuate in increments of seconds (In reality, prices are updated every tick time. The term "tick" here means an established deal. Note that the time between ticks is undetermined). That is, the virtual equilibrium price P* and the trading price P can be taken as a function with the time t as an argument, so in the following, the virtual equilibrium price P* and trading price P will be represented as P*(t) and P(t).

The trading price P(t) generally behaves such that in the event that it is lower than the virtual equilibrium price P*(t) it is drawn up (soars) so as to be close to the same, and conversely in the event that it is higher than the virtual equilibrium price P*(t) it is drawn down (drops) so as to be close to the same. Thus, in FIG. 2, the trading price P(t) has the properties of being "sucked into" point P*.

In FIG. 2, the inclination of the supply-and-demand curve near the virtual equilibrium price P*(t) (i.e., the inclination of the tangent near the intersection with the horizontal axis) indicates the degree whereby of being sucked into the virtual equilibrium price P*(t), it, the force of suction. The greater the inclination of the curve is, the greater the force of suction to P*(t) is, so the change of the trading price P(t) becomes small, and conversely, the smaller the inclination of the curve is, the smaller the force of suction to P*(t) is, so the change of the trading price P(t) becomes greater. That is to say, the inclination of the tangent near the intersection with the horizontal axis acts as a restoring force to return to P*(t), and can be likened to the resilience of a spring in the field of physics. This inclination of the tangent in the supply-and-demand curve is also referred to as a "price resilience coefficient" in the field of economics.

In this specification, the reciprocal number of the price resilience coefficient will be represented by "A". The price resilience coefficient also has be nature of fluctuating with passage of time, so this A will be represented as A(t) with time t as an argument. Note however, that A(t)>0 holds.

The Present Inventors have reached that the dealer trading price P(t) in an open market can be described with the following Probability Equation (1).

Expression 1

$$P(t+\Delta t)=P(t)+A(t\{P^*(t)-P(t)\} \qquad (1)$$

As shown in the Probability Equation (1), the trading price P(t+Δt) after time Δt has elapsed from the current time t is a value obtained by adding a fluctuation component made up of a value according to the difference between the current trading price P(t) and the virtual equilibrium price P*(t), to the basic component made up of the trading price P(t) which the dealer has currently set. That is to say, the fluctuation component of the price has the reciprocal number A(t) of the price resilience coefficient as a proportional constant thereof. That is, there is a type of linear relation between the trading price P(t) and the virtual equilibrium price P*(t).

Also, the Present Inventors have reached that the virtual equilibrium price P*(t) in an open market can be described with the following Probability Equation (2).

Expression 2

$$P^*(t+\Delta t)=P^*(t)+R(t)+B(t)\{P(t)-P(t-\Delta t)\} \qquad (2)$$

As shown in the Probability Equation (2), the virtual equilibrium price P(t+Δt) after time Δt has elapsed from the current time t has the current virtual equilibrium price P*(t) as the basic component, and also contains a random fluctuation component. The fluctuation component is represented as a random number R(t) which changes with passage of time. The random number R(t) can be easily produced with processing on a common computer.

Also, dealers have properties of learning the past price fluctuation history of the trading market. Accordingly, the virtual equilibrium price P(t+Δt) after time Δt has elapsed from the current time t is affected by recent price changes in the trading market, P(t)−P(t−Δt). The degree to which the virtual equilibrium price is affected by this price change also depends on the response speed of the dealers to the price fluctuations in the trading market. In the present specification, the proportionate coefficient dependent on the response speed of dealers to the price fluctuations will be represented by the "market instability coefficient B". This coefficient B also has a nature of fluctuating over time, and thus will be represented as B(t) with time t as an argument.

Accordingly, the virtual trading price P(t+Δt) after time Δt has elapsed from the current time t is obtained by adding the random component R(t) and the product of recent price changes P(t)−P(t−Δt) and the proportionate constant B(t) to the current virtual trading price P*(t), as shown in Expression 2.

The market instability coefficient B(t) is the reverse side of the expectation of the dealers to the trading market. A high market instability coefficient B(t) means that the dealers are casing excessively high expectations on the market, and will respond positively to price increases. That is, in the event that the market instability coefficient B(t) is great, the virtual equilibrium price P*(t) will sensitively follow real trading price fluctuations P(t)−P(t−Δt).

As can be understood from the Probability Equations (1) and (2), the values of the price resilience coefficient reciprocal number A(t) and the market instability coefficient B(t) greatly affect price fluctuations in the open market. FIGS. 3 through 6 show the results of simulating trading market behavior in the event that A(t) and B(t) are each great and small. The following is a description of the diagrams.

Figure 3:
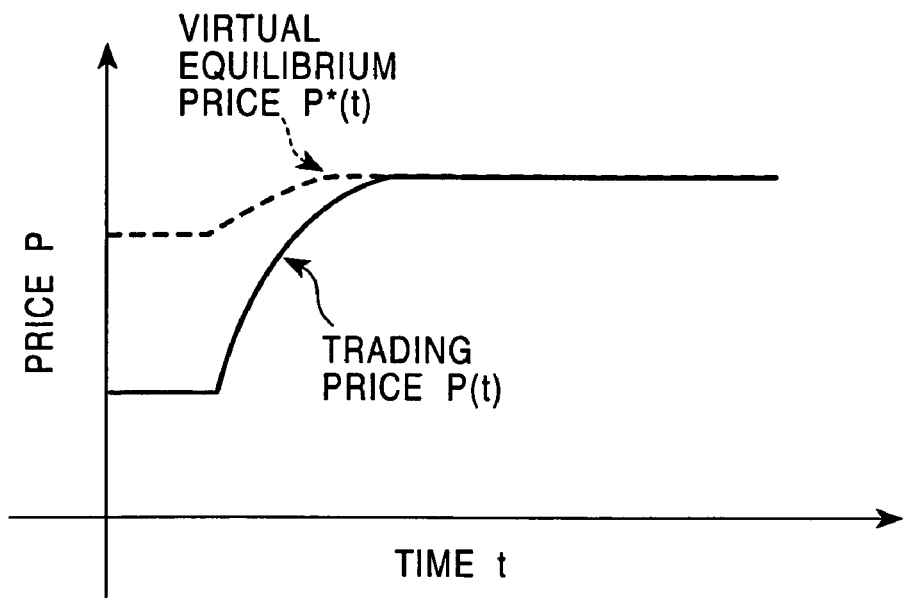
FIG. 3 is a chart illustrating the results of simulating trading market behavior in the event that the reciprocal number A(t) of the price resilience coefficient and the market instability coefficient B(t) are each great and small, and more specifically shows the simulation results in a case wherein A(t) and B(t) are both small.

FIG. 3 shows the simulation results in a case wherein A(t) and B(t) are both small. A small A(t) means that the price resilience coefficient is great, i.e., the amount of price fluctuation is small. Also, a small B(t) means that the effects on price fluctuation are small. Accordingly, in this case, the market trading price P(t) and virtual equilibrium price P*(t) both converge on a constant value, as shown in the FIG., and the trading market stabilizes.

Figure 4:
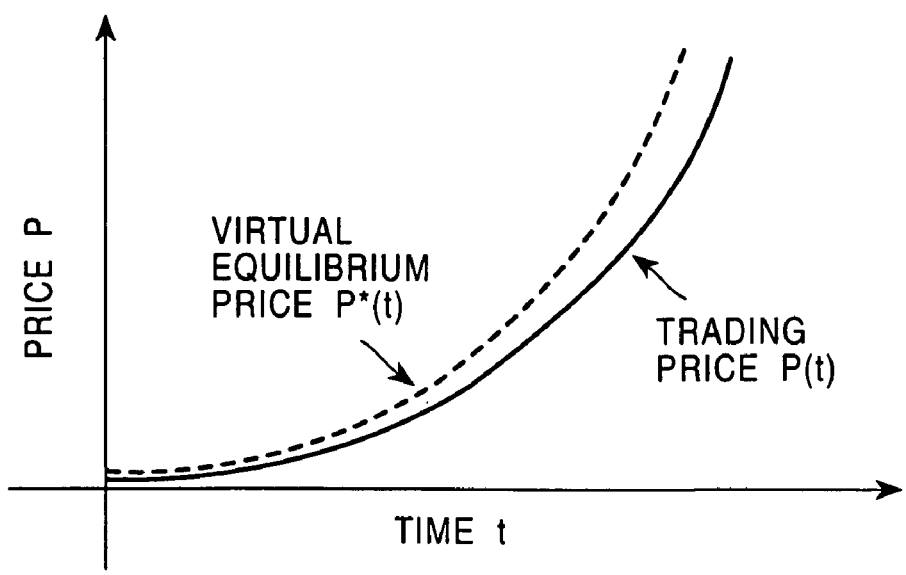
FIG. 4 is a chart illustrating the results of simulating trading market behavior in the event that the reciprocal number A(t) of the price resilience coefficient and the market instability coefficient B(t) are each great and small, and more specifically shows the simulation results in a case wherein A(t) is small but B(t) is great.

FIG. 4 shows the simulation results in a case wherein A(t) is small but B(t) is great. A small A(t) means that the price resilience coefficient is great, i.e., the amount of price fluctuation is small. A great B(t) means that the effects on price fluctuation are great. According to the Expressions (1) and (2), the trading price P(t) follows the rise of the virtual equilibrium price P*(t) and soars, and the rising of the trading price P(t) leads to further rising of the virtual equilibrium price P*(t), and this generates a chain reaction of rising prices. The result is a so-called "bubble" phenomena. It should be understood from the Figure that the somewhat parallel increase curves of P*(t) and P(t) mean a bubble phenomena. In other words, in the event that A(t) is small but B(t) is great, a prediction can be made that abnormal price fluctuations will occur in the trading market in the future.

Figure 5:
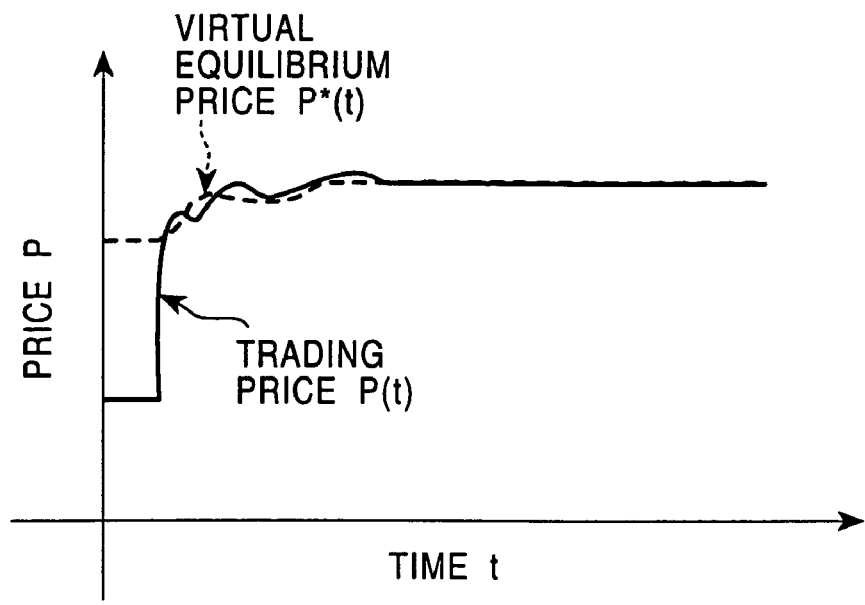
FIG. 5 is a chart illustrating the results of simulating trading market behavior in the event that the reciprocal number A(t) of the price resilience coefficient and the market instability coefficient B(t) are each great and small, and more specifically shows the simulation results in a case wherein A(t) is great but B(t) is small.

FIG. 5 shows the simulation results in a case wherein A(t) is great but B(t) is small. A great A(t) means that the price resilience coefficient is small, i.e., the amount of price fluctuation is great. A small B(t) means that the effects on price fluctuation are small. In this case, the trading price P(t) in the market follows the rise of the virtual equilibrium price P*(t) flexibly. However, B(t) is small, so the virtual equilibrium price P*(t) is dull in responding to trading price rises (P(t)−P(t−Δt)), and there is no more than a wavering which approximates the random number component R(t). Accordingly, in this case, as shown in the Figure, both the market trading price P(t) and the virtual equilibrium price P*(t) converge on a constant value, and the trading market stabilizes.

In the event that the market instability coefficient B(t) is near zero, the virtual equilibrium price P*(t) reaches a stable state wherein fluctuations are only around the random number coefficient R(t). This is dependent on the dealers hardly responding to fluctuations in trading prices. Also, in the event that B(t) assumes a negative value, this means that the dealers respond negatively to the trading price fluctuations, and the virtual equilibrium price P*(t), though fluctuating in response to trading price fluctuations, converges to a stable state.

Figure 6:
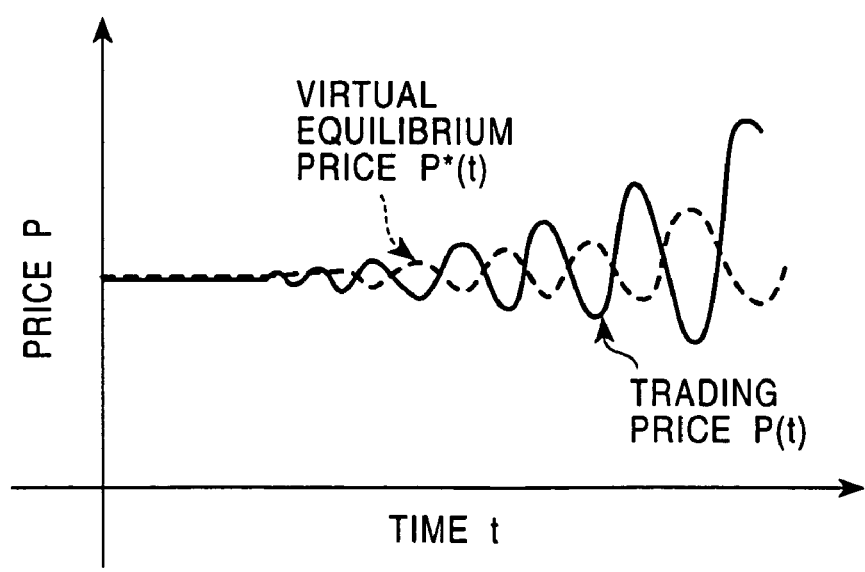
FIG. 6 is a chart illustrating the results of simulating trading market behavior in the event that the reciprocal number A(t) of the price resilience coefficient and the market instability coefficient B(t) are each great and small, and more specifically shows the simulation results in a case wherein A(t) and B(t) are both great.

FIG. 6 shows the simulation results in a case wherein A(t) and B(t) are both great. A great A(t) means that the price resilience coefficient is small, i.e., the amount of price fluctuation is great. A great B(t) means that the effects on price fluctuation are great. According to the Expressions (1) and (2), the trading price P(t) follows the rise of the virtual equilibrium price P*(t) and soars, but the virtual equilibrium price P*(t) is sluggish in following the rising of the trading price P(t). In other words, the trading price P(t) fluctuating widens the gap between the virtual equilibrium price P*(t) and the trading price P(t), and the amplitude of the vibrations of trading prices gradually increases, so the market becomes unstable. In other words, in the event that both A(t) and B(t) are great, a prediction can be made that abnormal price fluctuations will occur in the trading market in the future.

Figure 7:
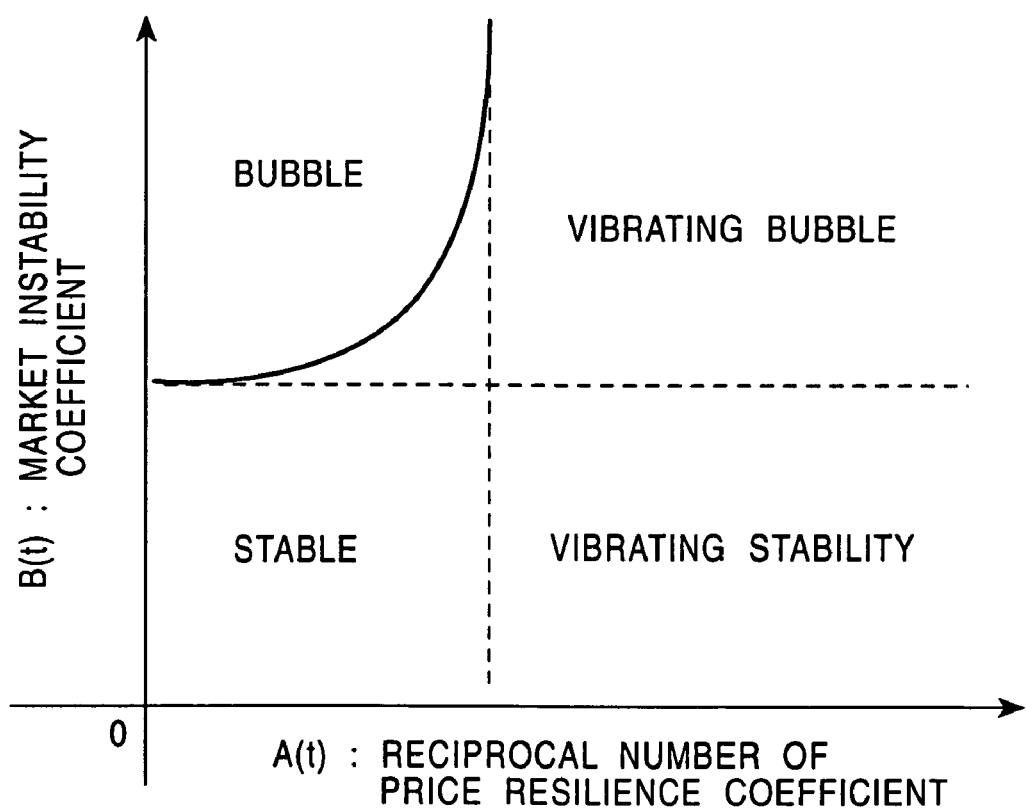
FIG. 7 is a diagram illustrating a model of the effects that the parameters A(t) and B(t) have on the open market.
Figure 8:
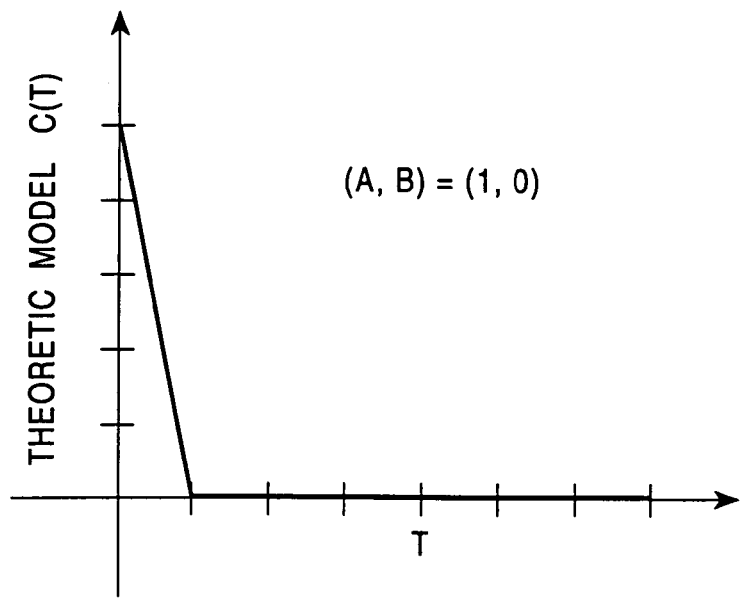
FIG. 8 is a chart illustrating a simulation of the pattern of a theoretical correlation function $C_v(T)$ in the event that a combination of values are provided to the parameters A and B such that (A, B)=(1, 0)
Figure 9:
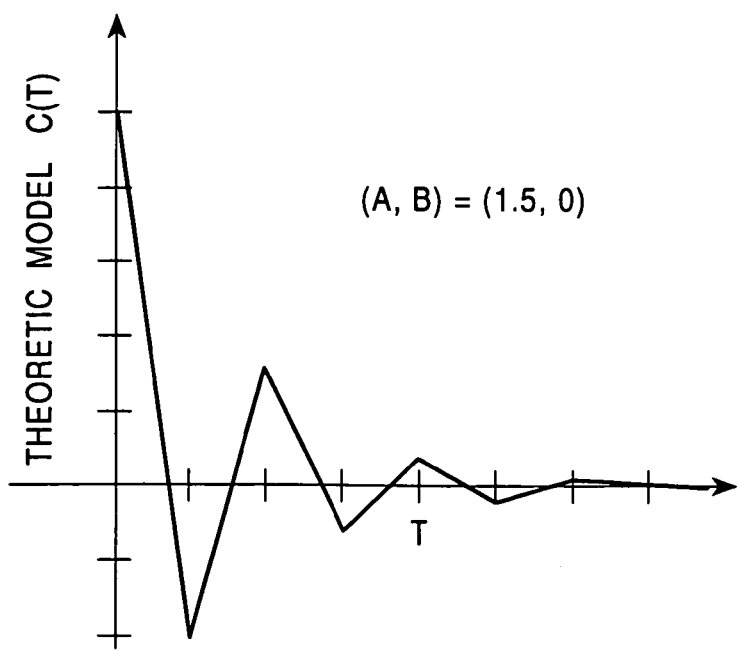
FIG. 9 is a chart illustrating a simulation of the pattern of a theoretical correlation function $C_v(T)$ in the event that a combination of values are provided to the parameters A and B such that (A, B)=(1.5, 0)
Figure 10:
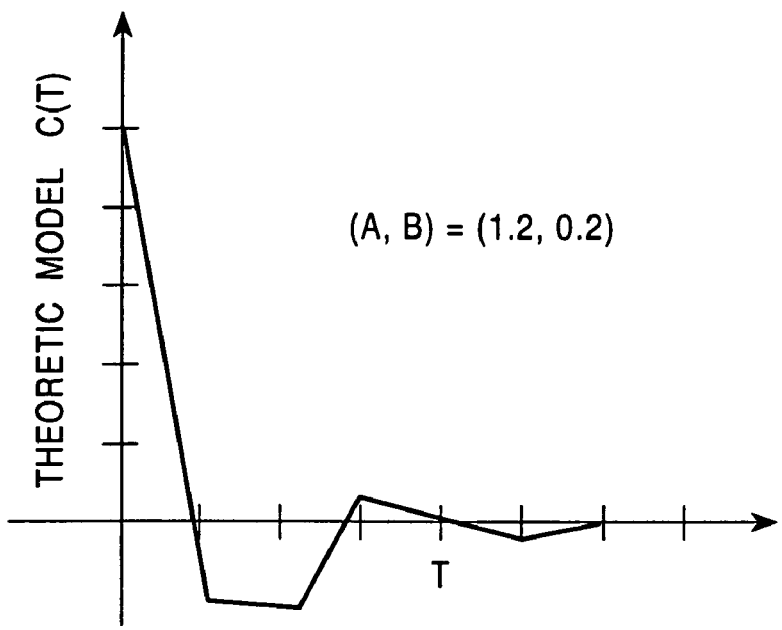
FIG. 10 is a chart illustrating a simulation of the pattern of a theoretical correlation function $C_v(T)$ in the event that a combination of values are provided to the parameters A and B such that (A, B)=(1.2, 0.2)
Figure 11:
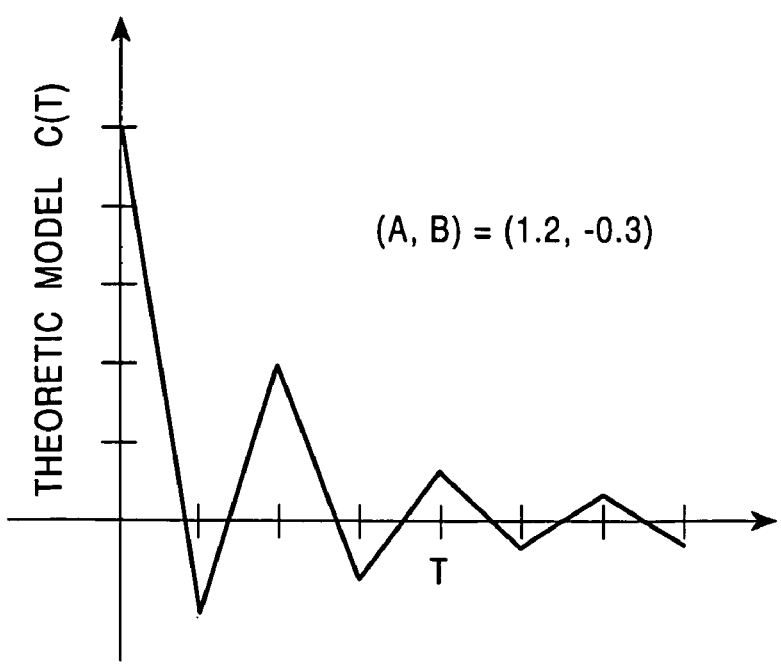
FIG. 11 is a chart illustrating a simulation of the pattern of a theoretical correlation function $C_v(T)$ in the event that a combination of values are provided to the parameters A and B such that (A, B)=(1.2, −0.3)
Figure 12:
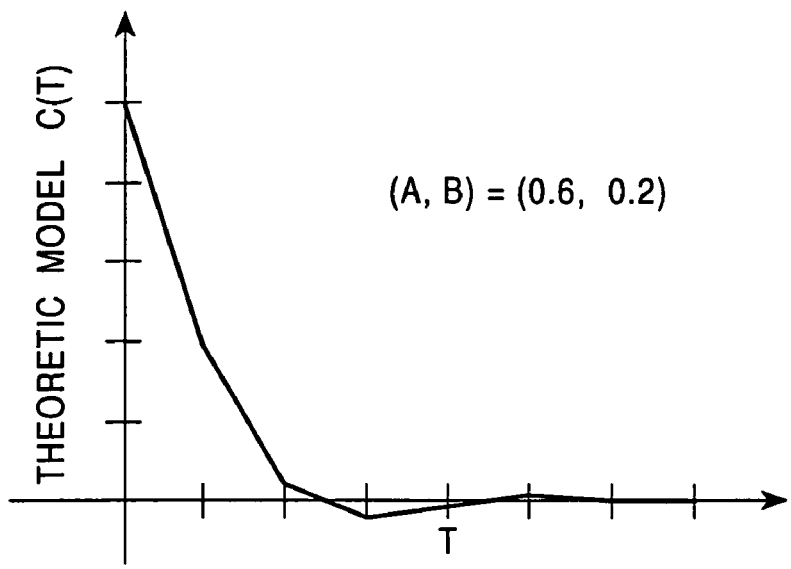
FIG. 12 is a chart illustrating a simulation of the pattern of a theoretical correlation function $C_v(T)$ in the event that a combination of values are provided to the parameters A and B such that (A, B)=(0.6, 0.2)
Figure 13:
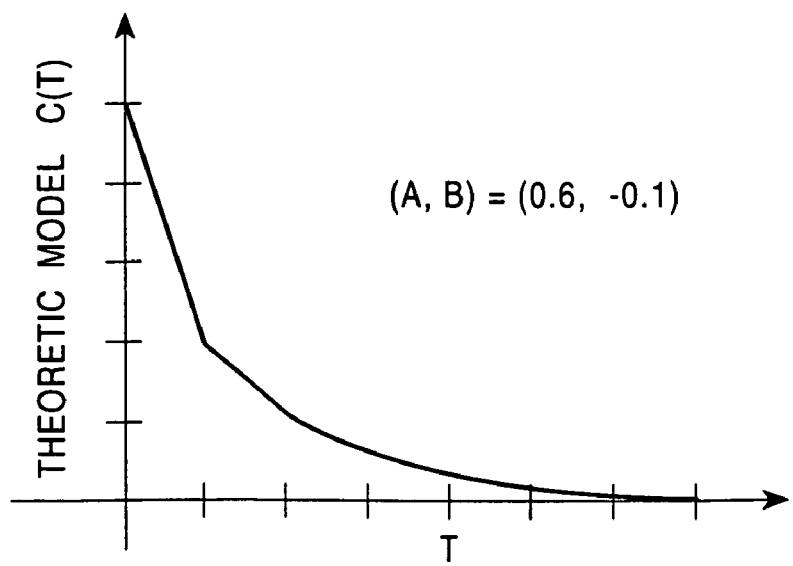
FIG. 13 is a chart illustrating a simulation of the pattern of a theoretical correlation function $C_v(T)$ in the event that a combination of values are provided to the parameters A and B such that (A, B)=(0.6, −0.1)

FIG. 7 is a diagram illustrating a model of the effects that the parameters A(t) and B(t) have on the open market. As shown in the diagram, in the range that B(t) has a great value, the virtual equilibrium price P*(t) reacts positively to fluctuations in real trading prices, and the real trading price P(t) follows it, so the trading market generates a so-called "bubble" phenomena, and the trading prices soar unchecked (as described above). Also, in the area that both A(t) and B(t) are great, the trading price sensitively reacts to the difference between the virtual equilibrium price and real trading prices. Consequently, this causes a vibrating type of "bubble" phenomena, wherein trading prices P(t) vibrate greatly.

On the other hand, in the area where B(t) is a small value, the trading price P(t) speedily converges to the virtual equilibrium price P*(t) in the event that A(t) is a small value, so the trading market stabilizes. Also, in the area that both A(t) is of a great value, the trading price sensitively reacts to the difference between the virtual equilibrium price and real trading prices, and thus contains a vibrating component. However, prediction of the virtual equilibrium price is not affected by change in the real trading price, and thus stabilizes. That is, the trading market is in a "vibrating stable" state.

From the above description, it should be thoroughly appreciated that in an open market wherein the real trading price P(t) and the virtual equilibrium price P*(t) can be described by the above Probability Equations (1) and (2), both the price resilience coefficient reciprocal number A(t) and the market instability coefficient B(t) are important parameters in predicting the behavior of the time-sequence data which is the trading price P(t).

Predicting fluctuations of trading prices P(t) does not only affect the profits of a group of dealers, but rather could affect the social stability of a region, nation, or even the global community.

Generally, it is thought that the movement of the trading market can be grasped by correlation functions regarding the fluctuations ΔP(t) of trading prices. Here, the correlation function C(T) in the time period from time t to time t+T is determined by the following Expression (3):

Expression 3

$$C(T) = \frac{\langle \Delta P(t+T)\Delta P(t) \rangle - \langle \Delta P(t) \rangle^2}{\langle \Delta P(t)^2 \rangle - \langle \Delta P(t) \rangle^2} \quad (3)$$

wherein the expression <ΔP (t+T) * ΔP (t)> means the average value of the products of price fluctuation in each of time t+T and time t, determined by the following Expression (4), wherein N represents the number of samples.

Expression 4

$$(\Delta P(t+T)\Delta P(t)) = 1/N\{\Delta P(t+T)\Delta P(t) + \Delta P(t+\Delta t+T)\Delta P(t+\Delta t) + \ldots + \Delta P(t+(N-1)\cdot\Delta t+T)\Delta P(t+(N-1)\cdot\Delta t)\} \quad (4)$$

As stated in the Description of the Related Art, in an open market, increasing the number of samples (i.e., continue measuring trading prices for long periods of time) and handling in a macro manner causes the sampled data to cancel one another out, thereby loosing the correlation so the movements in the trading market cannot be grasped.

Conversely with the present invention, the number of samples is restricted to a relatively small number, around several tens to several hundred, and handling these in a micro manner, thereby obtaining a correlation function C(T) sufficiently retaining local characteristic portions in the trading market. The number of samples may be, for example, around 50. In a trading market, a tick (i.e., an established deal) occurs every several seconds (note that the time between ticks is undetermined), so sampling can be completed in a short time, around 5 minutes.

On the other hand, the parameters A(t) and B(t) which represent price resilience and market instability are functions with the time t as an argument, but in a normal open market, these only change gradually over passage of time. Thus, within the above-described sampling period of around 5 minutes, A and B can be handled as constants.

Also, the Present Inventors have proved that a unique corresponding relation is established between the values of the parameters A and B which represent price resilience and market instability and the correlation function C(T). That is, the following Relational Expression (5) holds between the theoretical correlation function $C_v(T)$ and the parameters A and B.

Expression 5

$$C(T) = \frac{\alpha^T - \beta^T}{\alpha - \beta} \cdot \frac{A-1}{1+A \cdot B} - \alpha^T \cdot \beta + \alpha \cdot \beta^T \quad (5)$$

wherein α and β are as follows:
Expression 6

$$\alpha = \frac{1}{2AB}\left\{1 - A + \sqrt{(1-A)^2 - 4AB}\right\}$$

$$\beta = \frac{1}{2AB}\left\{1 - A - \sqrt{(1-A)^2 - 4AB}\right\}$$

Providing the Expression (5) with the parameters A and B enables the corresponding correlation function to be obtained. Accordingly, the present invention handles the correlation functions simulated as to the sets (A, B) of values provided to the parameters A and B as theoretical models. FIGS. 8 through 13 are charts illustrating the theoretical correlation functions $C_v(T)$ simulated according to the values provided to the parameters A and B.

As shown in FIGS. 8 through 13, the correlation function theoretical model $C_v(T)$ has a unique pattern as to the set of values provided to the parameters A and B. Accordingly, first, the price fluctuation ΔP(t) of the trading market is measured for around 5 minutes, and the correlation function C(T) is calculated. Next, one of the several prepared theoretical models which matches C(T) the best is selected, and the parameters A and B of the theoretical model $C_v(T)$ are identified as the parameters regarding the correlation function C(T) in the real trading market.

Incidentally, applying known calculating means such as the "least-squares method" to the actually-measured correlation function C(T) and matching with the theoretical models allows the best-matching theoretical model to be selected in a precise manner.

As already described, parameter A is the reciprocal number of the price resilience coefficient, and parameter B is the market instability coefficient. Rephrased, the values of these parameters are indicators of price resilience properties and market instability on the open market, respectively.

For example, A≈0 and B≈0 represent a stable trading market state. Also, B>0 and A<1 represent a bubble state. Further, B>0 and A>1 represent a vibrating deterioration, i.e., a vibrating stable state. Moreover, B>0 and A>0 represent a vibrating dispersion, i.e., a vibrating bubble state (see FIG. 7).

Accordingly, judgement, i.e., prediction can be made from the four states of "stable", "bubble", "vibrating stable", and "vibrating bubble", regarding the present state of the trading market, by combining the parameters A and B which the selected theoretical model $C_v(T)$ has.

The states of "bubble" and "vibrating bubble" are market states wherein the probability is great that trading prices in the open market will greatly fluctuate, which is extremely dangerous. Leaving such states unchecked not only causes loss to a group of dealers, but very well could create an unstable and dangerous phenomena for regions, nations, and even the global community.

Accordingly, in the event that market states of "bubble" and "vibrating bubble", i.e., price fluctuations, have been predicted, it is preferable that warnings are issued regarding this danger of price fluctuations, either on a local level of individual dealers, or on a worldwide level of regions, nations, and the global community.

The manner of the trading market in the open market can be corrected in response to this warning. Consequently, the socially and economically devastating phenomena called "bubble collapse" can be suitably avoided or eradicated on a local level of individual dealers, or on a worldwide level of regions, nations, and the global community.

All of the following processes necessary for realizing the present invention can be automated by executing predetermined processing procedures on a general-purpose computer system.

(1) Generating correlation function theoretical models $C_v(T)$ (see FIGS. 8 through 13)
(2) Sampling the trading prices P(t) on the open market and observing correlation function C(T)
(3) Matching the observed correlation function C(T) with the theoretical models, and selecting the theoretical model $C_v(T)$ which matches best
(4) Grasping the price fluctuation state of the open market, based on the parameter values A and B (i.e., price resilience coefficient and market instability coefficient) which the selected theoretical model $C_v(T)$ has
(5) Issuing a warning in response to detecting of dangerous price fluctuations in the open market According to the present invention, price fluctuations in the open market can be effectively and accurately predicted, in a short sampling time of around 5 minutes.

EMBODIMENT

An embodiment of the present invention will now be described with reference to the drawings.

Figure 14:
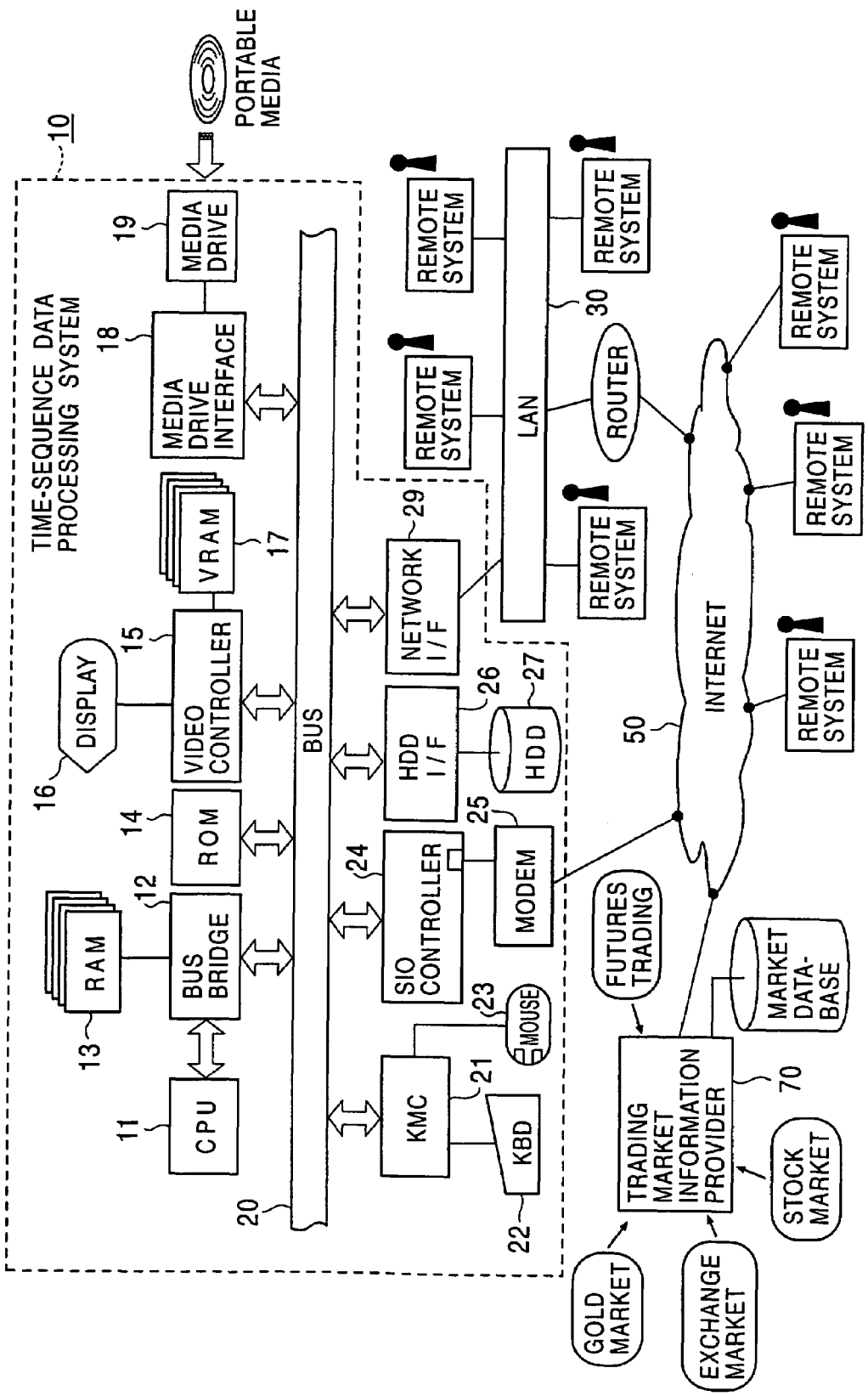
FIG. 14 is a diagram illustrating a model hardware configuration of the time-sequence data processing system 10 which is capable of suitably realizing time-sequence data processing according to the present invention wherein fluctuations in time-sequence data are predicted and warnings are issued according to the prediction results.

FIG. 14 is a diagram illustrating a model hardware configuration of the time-sequence data processing system 10 which is capable of suitably realizing time-sequence data processing according to the present invention wherein fluctuations in time-sequence data are predicted and warnings are issued according to the prediction results. This time-sequence data processing system 10 is particularly suitable for processing predictions of fluctuations in trading prices P(t) in an open market. Also, while the time-sequence data processing system 10 can be designed as a dedicated hardware apparatus, it can also be carried out using a general-purpose computer system. The following is a description of the components of the present system 10.

The CPU 11 is the main controller which centrally controls the actions of the entire time-sequence data processing system 10. The CPU 11 relating to this example is capable of executing various types of application software on a platform provided by an operating system. One example of an application program is "Trading Price Processing Software" (tentative name) for processing constantly-changing trading prices P(t) in an open market. The Trading Price Processing Software according to the present embodiment has been written by using computer language commands to describe prediction of price fluctuations in the open market, warning actions (described later) in response to prediction of abnormalities in price fluctuations, and so forth.

The processor bus directly connected to external pins of the CPU 11 is mutually connected with a bus 20 via a bus bridge 12.

The bus bridge 12 according to the present embodiment is configured including a data buffer for absorbing the speed difference between the processor bus and the system bus 31, and a memory controller for controlling memory access to the RAM 13.

The RAM (Random Access Memory) 13 is writable volatile memory which is used for loading program code to be executed by the CPU 11, and writing in work data from the executed program, and generally is configured of multiple DRAM (Dynamic RAM) chips. An example of an executed program is "Trading Price Processing Software" (tentative name) for processing constantly-changing trading prices P(t) in an open market.

The bus 20 is a shared signal transfer path which contains an address bus, data bus, control bus, etc.; a PCI (Peripheral Component Interconnect) bus is equivalent to this. The various peripheral devices matching the PCI interface specifications are mutually connected to the system bus 20. Individual I/O addresses (or memory addresses) are appropriated to each of the peripheral devices on the bus 20, and the CPU 11 (or more precisely, the program which the CPU 11 executes) specifies I/O addresses (or memory addresses) so as to realize transfer of data and commands to the desired peripheral devices.

The ROM (Read Only Memory) 14 is a read-dedicated memory for permanently storing self-diagnostic programs (POST) to be executed at the time of turning on the power to the time-sequence data processing system 10, basic input/output systems (BIOS) for operating the hardware, and other like code and so forth. The ROM 13 may be configured of an EEPROM (Electrically Erasable and Programmable ROM), for example.

The video controller 15 is a dedicated controller for controlling screen display on the display 16 following the drawing commands from the CPU 11, and has frame memory (VRAM) 17 for temporarily storing the drawing information. The display 16 may be a CRT (Cathode Ray Tube) display, LCD (Liquid Crystal Display), or the like.

The keyboard/mouse controller (KMC) 21 is a dedicated controller for processing input from the user using the keyboard 22, mouse 23, and so forth. The KMC 21 responds to scan code input from the keyboard 22 or detection of coordinates instructions input from the mouse 23, and issues interruption requests to the CPU 11.

The serial input/output (SIO) controller 24 is a peripheral controller for performing serial data exchange with the external devices of the time-sequence data processing system 10. A modem 25 is added on to the serial port which the SIO controller 24 prepares in order to perform modulation and demodulation of transferred data on analog telephone lines. Making PPP (Point-to-Point Protocol) connection to a predetermined access point (not shown) with the modem 25 allows the time-sequence data processing system 10 to be connected to the Internet 50, which is a Wide-Area Network of a global scale.

On the Internet 50, numerous hosts (computer systems which are also referred to as "remote systems" in this specification) are mutually connected based on TCP/IP (Transmission Control Protocol/Internet Protocol). A portion of the hosts act as servers to perform information providing and distributing services via the Internet 50, while other hosts act as clients requesting information. In the present embodiment, the disclosure and distribution of information may be either free or paid for. Also, in the event that the information is paid for, the billing method thereof is not particularly an issue with the present invention.

For example, a trading market information provider 70 may exist on the Internet 50. This information provider 70 constantly monitors fluctuations in trading prices P(t) occurring in open markets such as securities markets including stock markets, exchange markets, gold markets, futures markets, and so forth, and discloses or distributes such market information via the Internet 50. The time-sequence data processing system 10 according to the present embodiment may constantly obtain the constantly-changing trading prices data P(t) from this trading market information provider 70. Note that the information may either be obtained for free or paid for. Also, in the event that the information is paid for, the billing method thereof is not particularly an issue with the present invention. Incidentally, the trading market information provider 70 may have a database for storing market price fluctuation information.

Also, the time-sequence data processing system 10 according to the present embodiment itself may serve to disclose or distribute information to one or more remote systems scattered throughout the Internet 50. Examples of information to be provided include predictions of fluctuation of the trading prices P(t) in an open market, warning information at the time of predicting abnormalities in price fluctuations, and so forth. The data regarding to these price fluctuations is obtained by executing the "Trading Price Processing Software". Note that the information provided by the system 10 may either be free or paid for. Also, in the event that the information is paid for, the billing method thereof is not particularly an issue with the present invention.

Also, as is well-known, the Internet 50 is capable of file transfer. Accordingly, the time-sequence data processing system 10 may download a program file for installing the "Trading Price Processing Software" from a server on the Internet 50.

The hard disk drive (HDD) 27 is an external storage device for storing programs, data, and the like, as files of a certain format, and normally is of a relatively large size on the order of several Gigabytes. The HDD 27 is connected to the bus 20 via the hard disk interface 16. The interface specifications for connecting the hard disk drive to the computer system are IDE (Integrated Drive Electronics), for example.

The media drive 18 is a devices for mounting a detachable and portable recording medium, and reading and writing recording data held on the surface of the medium, and is mutually connected with the bus 20 by the media drive interface 18. The interface specifications for connecting the media drive 18 to the bus 20 are SCSI (Small Computer System Interface), for example.

Examples of recording media here include MO (Magneto-Optical) disks, CD-ROM, DVD (Digital Versatile Disk), FD (Floppy Disk), and so forth. Such types of recording media can generally be used to store computer programs described with commands made up of a computer language, other computer data, etc., in a tangible. and computer-readable format. The "Trading Price Processing Software" according to the present embodiment may be distributed in the form of being carried on a recording medium for example, and installed on the hard disk device 27 by the media drive 18.

The network interface 29 is a device for making mutual connection of the system 10 to a network such as a LAN (Local-Area Network) 30, following a predetermined communication protocol.

There is one or more hosts (computer systems which are also referred to as "remote systems" in this specification) on the LAN 30. On a local network space such as a LAN 30, the time-sequence data processing system 10 may disclose or distribute information to other remote systems. Examples of information to be provided include predictions of fluctuation of the trading prices P(t) in an open market, warning information at the time of predicting abnormalities in price fluctuations, and so forth. The data regarding to these price fluctuations isobtainedby executingthe "Trading Price Processing Software". The time-sequence data processing system 10 may also download program files for installing the "Trading Price Processing Software" from a remote system on the LAN 30.

Also, the LAN 30 may be mutually connected with the Internet 50 via a router.

Now, a great many other electrical circuits and the like in addition to those shown in FIG. 5 are necessary to make up a time-sequence data processing system 10. However, these are known to those skilled in the art, and do not make up the essence of the present invention, and thus have been omitted in the present specification. Further, note that only a portion of connections between the hardware blocks in the Figure have been shown, in order to avoid the drawing from becoming complicated.

Figure 15:
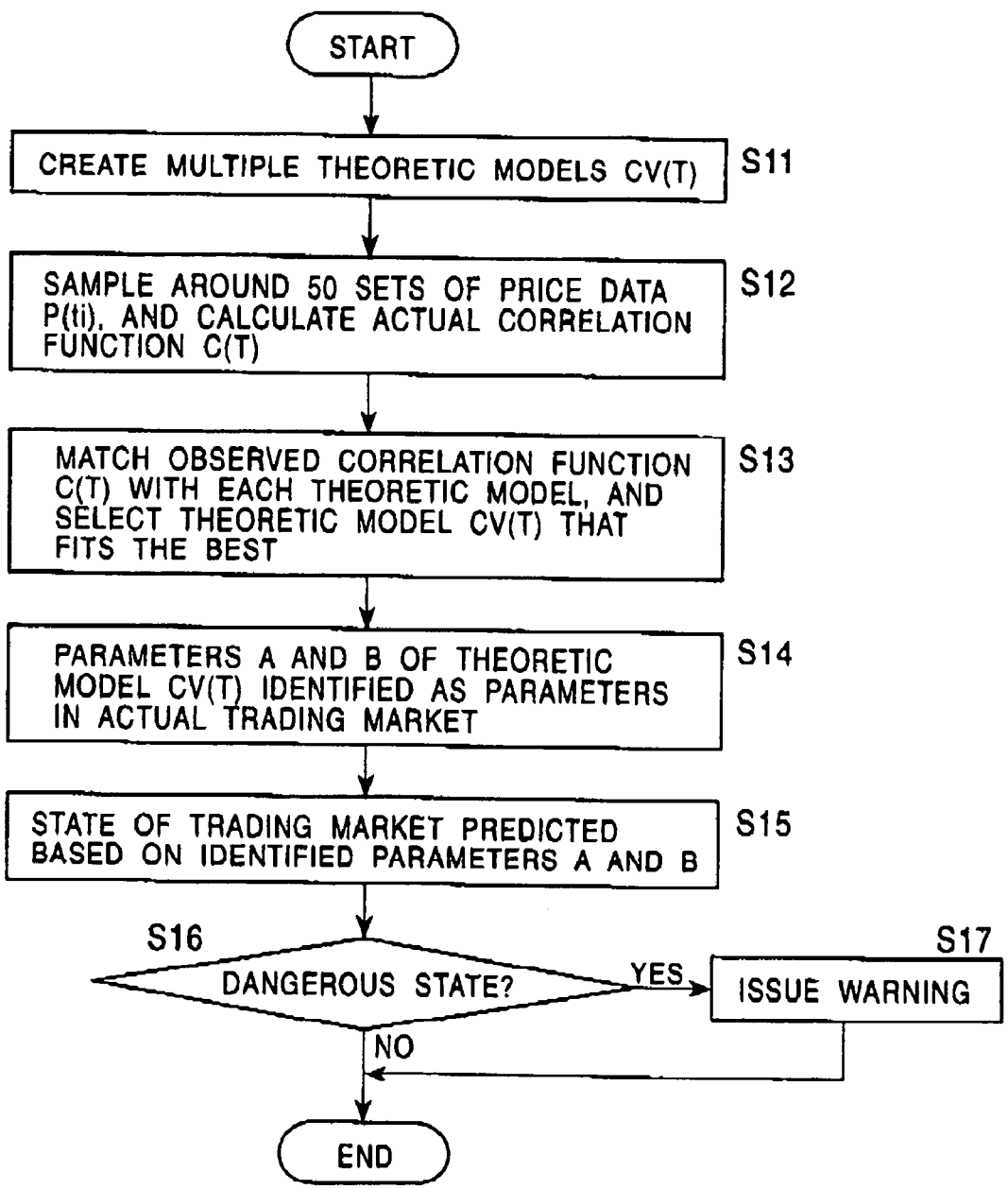
FIG. 15 is a flowchart illustrating the processing procedures to be executed by the time-sequence data processing system 10.

Next, the processing procedures for the price fluctuation prediction and the warning action responding to abnormal prediction results in price fluctuation, with the time-sequence data processing system 10, will be described. The processing procedures are carried out by executing the "Trading Price Processing Software" with the time-sequence data processing system 10. FIG. 15 is a flowchart illustrating the processing procedures to be executed by the time-sequence data processing system 10. The following is a description of the steps in this flowchart.

First, in step S11, multiple correlation function theoretical models $C_v(T)$ for the trading market are generated. Each of the parameters A and B of the theoretical models $C_v(T)$ generated here are appropriated various values. In the present embodiment, theoretical models are generated for each of the cases of (A, B)=(1, 0), (1.5, 0), 1.2, 0.2), (1.2, −0.3), (0.6, 9.2), (0.6, −0.1), and so forth.

Here, parameter A is the reciprocal number of the price resilience coefficient in the trading market (see the above Expression (1)), and parameter B is the market instability coefficient in the trading market (see the above Expression (2)). In the open market, the price resilience coefficient reciprocal number A and the market instability coefficient B are important parameters in predicting the behavior of the time-sequence data which is the trading price P(t).

The generated theoretical models are saved in the system 10 in a local storage device such as a hard disk device 27 for example. However, the time-sequence data processing system 10 itself does not necessarily have to generate the theoretical models, rather, these may be supplied externally by a transportable medium. Or, data relating to theoretical models may be distributed by a remote system on the LAN 30 or Internet 50, either free of charge or paid for.

The price P(t) of a given product trading on the open market is constantly being input to the time-sequence data processing system 10. In an open market, the price P(t) is updated for each tick (i.e., an established deal) generated.

The input of the price data P(t) is performed from the trading market information provider 70 via the Internet 50, as described above. However, data input is not restricted to this, and may depend on other means.

In step S12, the time-sequence data processing system 10 samples around 50 sets of price data P(ti) (wherein "i" indicates the order of sampling), and then calculates the correlation function C(T) relating to the trading price P(t) between time t and time t+T. The above Expression (3) for example can be used for calculation of the correlation function C(T).

Generally, a tick occurs every several seconds, so sampling of around 50 sets of data requires around 5 minutes. In other words, the time-sequence data processing system 10 according to the present embodiment calculates correlation functions every 5 minutes.

In an open market, increasing the number of samples mutually cancels out the characteristic portions of each set of data, which results in the correlation function converging to zero and becoming meaningless (as described above). Accordingly, with the present embodiment, the number of samples has be restricted to a small number, thereby retaining the characteristic portions in the correlation function.

Next, in step S13, matching is performed between the correlation function C(T) observed in step S12 with the theoretical models prepared beforehand in step S11, and the theoretical model $C_v(T)$ which matches best is selected.

For example, applying known calculating means such as the "least-squares method" to the actually-measured correlation function C(T) and matching with the theoretical models allows the best-matching theoretical model $C_v(T)$ to be selected in a precise manner.

Then, the parameters A and B of the theoretical model $C_v(T)$ selected in step S13 are identified as the parameters for the real trading market (step S14).

The price resilience coefficient reciprocal number A and the market instability coefficient B are important parameters in predicting the behavior of the time-sequence data which is the trading price P(t). That is, as shown in FIG. 7, A≈0 and B≈0 represent a stable trading market state. Also, B>0 and A<1 represent a bubble state. Further, B>0 and A>1 represent a vibrating deterioration, i.e., a vibrating stable state. Moreover, B>0 and A>0 represent a vibrating dispersion, i.e., a vibrating bubble state.

In step S15, judgement, is made from the four states of "stable", "bubble", "vibrating stable", and "vibrating bubble", regarding the present state of the trading market, based on the identified parameters A and B.

In the event that one of the states of "bubble" or "vibrating bubble" which are dangerous market states has been predicted, predetermined warnings are issued by the time-sequence data processing system 10 (steps S16 and S17).

The form of warning is not restricted in particular. For example, a warning may be issued either on a local level of individual dealers, or on a worldwide level of regions, nations, and the global community.

The former warning on the local level is realized by, for example, opening a predetermined warning dialogue box on the screen of the display 16, issuing a warning tone from a speaker (not shown), or the like.

Also, the latter warning on the global level is realized by transmitting a predetermined warning message to remote systems existing on the LAN 30 via the network interface 29, transmitting the warning message to the remote systems scattered over the Internet 50 via the modem 25, performing broadcast messaging, and so forth.

The manner of the trading market in the open market can be corrected in response to this warning thus issued by the time-sequence data processing system 10. Consequently, the socially and economically devastating phenomena called "bubble collapse" can be suitably avoided or eradicated on a local level of individual dealers, or on a worldwide level of regions, nations, and the global community.

Now, the present invention has been described with reference to a particular embodiment. However, it is self-evident that one skilled in the art can make various alterations and substitutions to the embodiment without departing from the scope or spirit of the present invention. In other words, the present invention has been disclosed in the form of an example, and the embodiment should not be interpreted restrictively. The scope of the present invention is to be determined solely by the following claims.

As described above, according to the present invention, an excellent time-sequence data processing device and processing method which handles as time-sequence data prices relating to products, services, etc., in a marketplace economy, can be provided, so as to predict fluctuations in data and further issue warnings according to the prediction results.

Also, according to the present invention, an excellent time-sequence data processing device and processing method which handles as time-sequence data prices in an open market wherein dealers are allowed to freely set prices, can be provided, so as to predict product prices which fluctuate according to trading, and further issue warnings according to prediction results of prices.

According to the present invention, price fluctuations in the open market can be effectively and accurately predicted, in a short sampling time of around 5 minutes. Further, in the event that the prediction results of price fluctuatiqn indicate states on the open market which cause dangerous economic phenomena such as "bubble" and "vibrating bubble", warnings can be issued suitably.

The manner of trading in the open market can be corrected in response to this warning. Consequently, the socially and economically devastating phenomena called "bubble collapse" can be suitably avoided or eradicated on a local level of individual dealers, or on a worldwide level of regions, nations, and the global community.

What is claimed is:

1. A fluctuation of prices predicting device for market price time-sequence data of an open market, said device comprising:

holding/preserving means for holding/preserving theoretical models of correlation functions, wherein said models are generated based on a price elasticity and market uncertainties;

acquiring means for acquiring sampling data by sampling a local portion of the real time-sequence data;

generating means for generating a real correlation function based on the sampling data;

selecting means for selecting one of the theoretical models that best matches the real correlation function, and judging one of the states regarding the real market price time-sequence data; and indicating means for indicating a fluctuation of the real market price time-sequence data based on a relation established between the price elasticity and the market uncertainties of the selected theoretical model;

wherein the theoretical model of the correlation function is generated based on the following:

real time-sequence data having a virtual equilibrium price that is provided by multiplying the market uncertainties by a recent change value of the real market price time-sequence data; and a value of the real market price time-sequence data after a time $\Delta t$ that is provided by multiplying the price elasticity by a difference between a value of the real market price time-sequence data in a current time t and the virtual equilibrium price.

2. A fluctuation of prices predicting method for market price time-sequence data of an open market, said method comprising the steps of:

holding/preserving theoretical models of correlation functions, wherein said models are generated based on a price elasticity and market uncertainties;

acquiring sampling data by sampling a local portion of the real time-sequence data;

generating a real correlation function based on the sampling data;

wherein the theoretical model of the correlation function is generated based on the following:

selecting one of the theoretical models that matches the real correlation function, and judging one of the states regarding the real market price time-sequence data; and indicating a fluctuation of the real market price time-sequence data based on a relation established between the price elasticity and the market uncertainties of the selected theoretical model;

wherein the theoretical model of the correlation function is generated based on the following:

real time-sequence data having a virtual equilibrium price that is provided by multiplying the market uncertainties by a recent change value of the real market price time-sequence data; and a value of the real market price time-sequence data after a time $\Delta t$ that is provided by multiplying the price elasticity by a difference between a value of the real market price time-sequence data in a current time t and the virtual equilibrium price.

3. A fluctuation of prices predicting program for market price time-sequence data of an open market stored in a memory operable to instruct a programmable processor to store data to a recording/reproducing medium, said program having the steps of:

holding/preserving theoretical models of correlation functions, wherein said models are generated based on a price elasticity and market uncertainties;

acquiring sampling data by sampling a local portion of the real time-sequence data;

generating a real correlation function based on the sampling data;

selecting one of the theoretical models that best matches the real correlation function, and judging one of the states regarding the real market price time-sequence data; and indicating a fluctuation of the real market price time-sequence data based on a relation established between the price elasticity and the market uncertainties of the selected theoretical model;

wherein the theoretical model of the correlation function is generated based on the following:

real time-sequence data having a virtual equilibrium price that is provided by multiplying the market uncertainties by a recent change value of the real market price time-sequence data; and a value of the real market price time-sequence data after a time $\Delta t$ that is provided by multiplying the price elasticity by a difference between a value of the real market price time-sequence data in a current time t and the virtual equilibrium price.

* * * * *